(12) United States Patent
Beaudin et al.

(10) Patent No.: US 10,594,415 B2
(45) Date of Patent: Mar. 17, 2020

(54) MONITORING SIGNAL STRENGTH OF SIGNAL IDENTIFIED FROM UNMANNED AERIAL VEHICLE

(71) Applicant: HEWLETT PACKARD ENTERPRISE DEVELOPMENT LP, Houston, TX (US)

(72) Inventors: Andre Beaudin, Montreal (CA); Mohd Shahnawaz Siraj, San Jose, CA (US); Qiang Zhou, Beijing (CN)

(73) Assignee: Hewlett Packard Enterprise Development LP, Houston, TX (US)

( * ) Notice: Subject to any disclaimer, the term of this patent is extended or adjusted under 35 U.S.C. 154(b) by 65 days.

(21) Appl. No.: 15/962,683

(22) Filed: Apr. 25, 2018

(65) Prior Publication Data
US 2019/0334641 A1    Oct. 31, 2019

(51) Int. Cl.
| | | |
|---|---|---|
| *H04B 17/318* | (2015.01) | |
| *H04W 4/40* | (2018.01) | |
| *H04W 60/06* | (2009.01) | |
| *H04W 76/19* | (2018.01) | |
| *G08G 5/00* | (2006.01) | |
| *H04W 36/30* | (2009.01) | |
| *H04W 76/18* | (2018.01) | |
| *B64C 39/02* | (2006.01) | |

(52) U.S. Cl.
CPC ......... *H04B 17/318* (2015.01); *B64C 39/024* (2013.01); *G08G 5/0013* (2013.01); *H04W 4/40* (2018.02); *H04W 36/305* (2018.08); *H04W 60/06* (2013.01); *H04W 76/18* (2018.02); *H04W 76/19* (2018.02)

(58) Field of Classification Search
None
See application file for complete search history.

(56) References Cited

U.S. PATENT DOCUMENTS

| | | | |
|---|---|---|---|
| 9,704,408 B2 | 7/2017 | Yu et al. | |
| 2013/0023201 A1* | 1/2013 | Coleman | H04K 3/45 455/1 |
| 2015/0071135 A1* | 3/2015 | Kapoor | H04W 36/06 370/281 |
| 2015/0350914 A1* | 12/2015 | Baxley | H04W 12/08 726/11 |
| 2017/0094527 A1 | 3/2017 | Shattil et al. | |

(Continued)

OTHER PUBLICATIONS

Unknown, Drones: Detect, identify, intercept and hijack, Retrieved Feb. 23, 2018, 11 Pgs.

*Primary Examiner* — Noel R Beharry
*Assistant Examiner* — Ruihua Zhang
(74) *Attorney, Agent, or Firm* — McDermott Will & Emery

(57) ABSTRACT

A method of adjusting a link in a wireless communication system is described. The method includes monitoring a communication channel by a network device in a wireless local area network. The method also includes detecting a signal identified as being transmitted by an unmanned aerial vehicle on the communication channel. The method further includes transmitting a signal with a duty cycle having a predetermined value in the communication channel and monitoring a received signal strength indicator of the signal identified from the unmanned aerial vehicle. In some embodiments, the transmitted signal includes one or more of an interference signal, a de-authentication frame, and a disassociation frame.

17 Claims, 7 Drawing Sheets

(56) References Cited

U.S. PATENT DOCUMENTS

| | | |
|---|---|---|
| 2017/0111824 A1 | 4/2017 | Wang |
| 2017/0148332 A1* | 5/2017 | Ziemba ................ G08G 5/0013 |
| 2017/0195945 A1 | 7/2017 | Solomon et al. |
| 2018/0129884 A1* | 5/2018 | Seeber .................... G06T 7/223 |
| 2019/0098632 A1* | 3/2019 | Martin .................. H04W 16/14 |

* cited by examiner

MONITORING SIGNAL STRENGTH OF SIGNAL IDENTIFIED FROM UNMANNED AERIAL VEHICLE

BACKGROUND

Wireless local area networks are provided in commercial, residential, and educational environments. A company may provide a wireless local area network in its buildings such that the employees may communicate on the company network from different building locations of the company. The wireless local area network may include a number of network devices that are installed inside and outside the building. Client devices of the employees may connect to the local area network by communicating with one of the network devices from inside or outside the company building on or around the company premise.

A network controller may manage the network devices and may monitor communication links between the client devices and the network devices. Each communication link between a network device and a client device may use at least one channel that is selected by the network device and/or the network controller. The network controller and/or the network devices may detect communications other than communications from client devices on the channels that may or may not be recognizable by the network device.

SUMMARY

According to various aspects of the subject technology, a method of monitoring a communication channel by a network device is described. The method includes monitoring a communication channel by a network device in a wireless local area network. The method also includes detecting a signal identified as being transmitted by an unmanned aerial vehicle (or "drone") on the communication channel. The method further includes transmitting an interference signal with a duty cycle of a predetermined value in the communication channel and monitoring a received signal strength indicator of the signal identified from the unmanned aerial vehicle.

According to various aspects of the subject technology, a method of monitoring a communication channel by a network device is described. The method includes monitoring a communication channel by a network device in a wireless local area network. The method also includes detecting a signal identified as being transmitted by an unmanned aerial vehicle on the communication channel. The method further includes transmitting a de-authentication frame with a duty cycle having a predetermined value in the communication channel and monitoring a received signal strength indicator of the signal identified from the unmanned aerial vehicle.

According to various aspects of the subject technology, a method of monitoring a communication channel by a network device is described. The method includes monitoring a communication channel by a network device in a wireless local area network. The method also includes detecting a signal identified as being transmitted by an unmanned aerial vehicle on the communication channel. The method further includes transmitting a disassociation frame with a duty cycle of a predetermined value in the communication channel and monitoring a received signal strength indicator of the signal identified from the unmanned aerial vehicle.

According to various aspects of the subject technology, a network device of a wireless local area network is described. The network device includes a memory and a processor that executes instructions from the memory. By executing the instructions, the processor monitors a communication channel in a wireless local area network. The processor also detects a signal identified as being transmitted by an unmanned aerial vehicle on the communication channel. The processor further transmits a de-authentication frame with a duty cycle having a predetermined value in the communication channel and monitors a received signal strength indicator of the signal identified from the unmanned aerial vehicle.

According to various aspects of the subject technology, a non-transitory machine-readable storage medium encoded with instructions executable by at least one processor of a network device is described. By executing the instruction, the processor monitors a communication channel in a wireless local area network. The processor also detects a signal identified as being transmitted by an unmanned aerial vehicle on the communication channel. The processor further transmits a disassociation frame with a duty cycle having a predetermined value in the communication channel and monitors a received signal strength indicator of the signal identified from the unmanned aerial vehicle.

According to various aspects of the subject technology, a network device includes means for monitoring a communication channel by a network device in a wireless local area network and detecting a signal identified as being transmitted by an unmanned aerial vehicle on the communication channel. The network device also includes means for transmitting a signal in the communication channel and monitors a received signal strength indicator of the signal identified from the unmanned aerial vehicle.

The foregoing has outlined rather broadly the features of the present disclosure in order that the detailed description that follows can be better understood. Additional features and advantages of the disclosure will be described hereinafter, which form the subject of the claims.

BRIEF DESCRIPTION OF THE DRAWINGS

For a more complete understanding of the present disclosure, and the advantages thereof, reference is now made to the following descriptions to be taken in conjunction with the accompanying drawings describing specific aspects of the disclosure, wherein.

Figure 1:
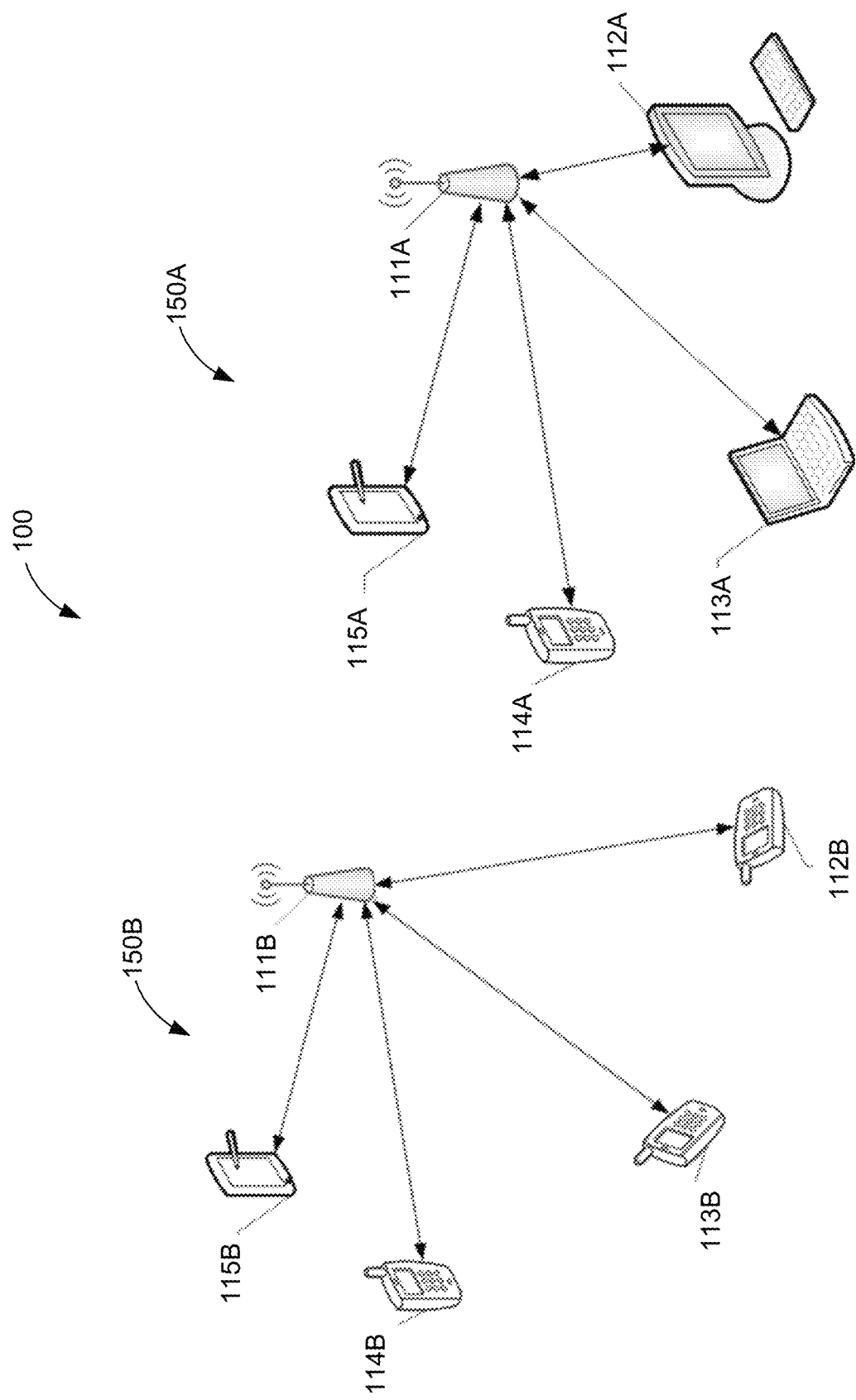
FIG. 1 illustrates a schematic diagram of an exemplary communication system, according to some aspects of the disclosure.

In one or more implementations, not all of the depicted components in each figure may be required, and one or more implementations may include additional components not shown in a figure. Variations in the arrangement and type of the components may be made without departing from the scope of the subject disclosure. Additional components, different components, or fewer components may be utilized within the scope of the subject disclosure.

DETAILED DESCRIPTION

The detailed description set forth below is intended as a description of various implementations and is not intended to represent the only implementations in which the subject technology may be practiced. As those skilled in the art would realize, the described implementations may be modified in various different ways, all without departing from the scope of the present disclosure. Accordingly, the drawings and description are to be regarded as illustrative in nature and not restrictive.

In some embodiments, a method is implemented to perform unmanned aerial vehicle detection, e.g., drone detection, and mitigation using a network device. Wireless local area networks may be installed in commercial, residential, and educational environments and may be operated at a number of frequency bands, e.g., 2.4 GHz and 5 GHz bands. Wireless local area networks may include a number of network devices that can be installed at various locations inside and outside buildings of commercial, residential, and educational environments. In some examples, a company may have a number of buildings with close physical proximity on a piece of land, e.g., a lot. Portions of the lot may also be designated for parking spaces and for recreational areas. In some examples, the company may provide a wireless local area network on the entire lot. The wireless local area network may cover the company buildings, recreational areas, and parking spaces, such that client devices of the employees may communicate with the company network from different locations on the lot. Thus, network devices may be installed inside the company buildings as well as outside the company buildings. In some examples, network devices may be installed on a building roof or in the parking spaces.

A network controller of the wireless local area networks may communicate with the network devices and may control the network devices and subnetworks that are coupled to each network device. In some examples, the network devices may receive signals from inside and outside company buildings. Some of the signals may be received from client devices that are coupled to the network devices and are authenticated by the network devices or the network controller as authentic client devices. Some of the signals may be received from mobile communication or from other wireless local area networks. In some examples, network devices receive signals that are from unmanned aerial vehicles that operate in a same frequency band as the network devices and are in a vicinity of the company premise.

In some embodiments, the network device may determine that an unmanned aerial vehicle may be a source of the signal received by the network device. In particular, the network devices that are installed outside the company buildings may receive communication signals and/or control signals from an unmanned aerial vehicle that may also operate at a 2.4 GHz band and/or at a 5 GHz band. Considering a limited range of coverage of the network devices, receiving a signal from an unmanned aerial vehicle may indicate that the unmanned aerial vehicle is in a proximity of the company premise. Detecting an unmanned aerial vehicle, flying overhead with a camera, in the proximity of the company building may be a source of concern for commercial spying. In some embodiments, the network device that receives the signal from the unmanned aerial vehicle may transmit an interference signal with a predefined duty cycle to force the unmanned aerial vehicle to leave the proximity of the network device.

In some examples, a portion of the signal from the unmanned aerial vehicle may be recognizable by the network device that receives the signal. In some examples, the network device may transmit a suspicious signal to the network controller and the network controller may recognize a portion of the signal received from the unmanned aerial vehicle. In some examples, the signal received from the unmanned aerial vehicle includes a media access control address (MAC address) of a transmitter of the unmanned aerial vehicle. In some embodiments, a detector of the network device and/or the network controller may detect the MAC address of the received signal. Based on the detected MAC address, the network device and/or the network controller may determine that the signal has been transmitted by an unmanned aerial vehicle. In some embodiments, a detector of the network device and/or the network controller may determine that the MAC address belongs to an unmanned aerial vehicle manufacturer and thus may determine that the signal is received from an unmanned aerial vehicle.

FIG. 1 illustrates a schematic diagram of an exemplary communication system, according to some aspects of the disclosure. Communication system 100 may include wireless communication subnetworks 150A and 150B. In each one of the wireless communication subnetworks, such as a wireless local area network (WLAN), a basic service set (BSS) includes a plurality of network devices (e.g., WLAN devices). In one aspect, a BSS refers to a set of multiple network devices (e.g., access points) that can communicate in synchronization, rather than a concept indicating a particular area. In the example, the wireless communication subnetwork 150A includes network device 111A and client devices 112A-115A. In addition, the wireless communication subnetwork 150B includes network device 111B and client devices 112B-115B. In some embodiments, the wireless communication subnetworks 150A and 150B may work at a 2.4 GHz band and/or at a 5 GHz band.

As used herein, a "network device" generally includes a device that is adapted to transmit and/or receive signaling and to process information within such signaling such as a station (e.g., any data processing equipment such as a computer, cellular phone, personal digital assistant, tablet devices, etc.), an access point, data transfer devices (such as network switches, routers, controllers, etc.) or the like. As used herein, an "access point" (AP) generally refers to receiving points for any known or convenient wireless access technology which may later become known. Specifically, the term AP is not intended to be limited to IEEE 802.11-based APs. APs generally function as an electronic device that is adapted to allow wireless devices to connect to a wired network via various communications standards.

Each one of the network devices 111A and 111B and/or client devices 112A-115A and 112B-115B may include a media access control (MAC) layer and a physical (PHY) layer according to IEEE 802.11 standards. In the example, at least one network device (e.g., network device 111A or 111B) is an access point (AP).

In some embodiments, a network controller of the communication system may communicate to the network devices and may control the network devices. In some examples, client device 114A may move away from network device 111A and get closer to network device 111B. Alternatively, an object, e.g., a human body, may move in between client device 114A and network device 111A. Thus, a network controller of the communication system 100 may communicate with network device 111A and network device 111B and hand off client device 114A from network device 111A to network device 111B. In some examples, the network controller is included in one of the network devices, e.g., the network controller is included in network device 111A. Thus, network device 111A may communicate with network device 111B and hand off client device 114A from network device 111A to network device 111B.

A network device may be, for example, an AP, a centralized controller (e.g., network controller), a base station (BS), a node-B, a base transceiver system (BTS), a site controller, a network adapter, a network interface card (NIC), a router, or the like. A client device (e.g., a client device operable by a user) may be, for example, a device with wireless communication capability, a terminal, a wireless transmit/receive unit (WTRU), a user equipment (UE), a mobile station (MS), a mobile terminal, a mobile subscriber unit, a laptop, a non-mobile computing device (e.g., a desktop computer with wireless communication capability) or the like.

In one aspect, a network device is a functional entity for providing access to a distribution system, by way of a wireless medium, for an associated client device. For example, a network device may provide access to the internet for one or more client devices that are wirelessly and communicatively connected to the network device. In FIG. 1, wireless communications between client devices are made by way of a network device. However, when a direct link is established between client devices, the client devices can communicate directly with each other (without using a network device).

Figure 2:
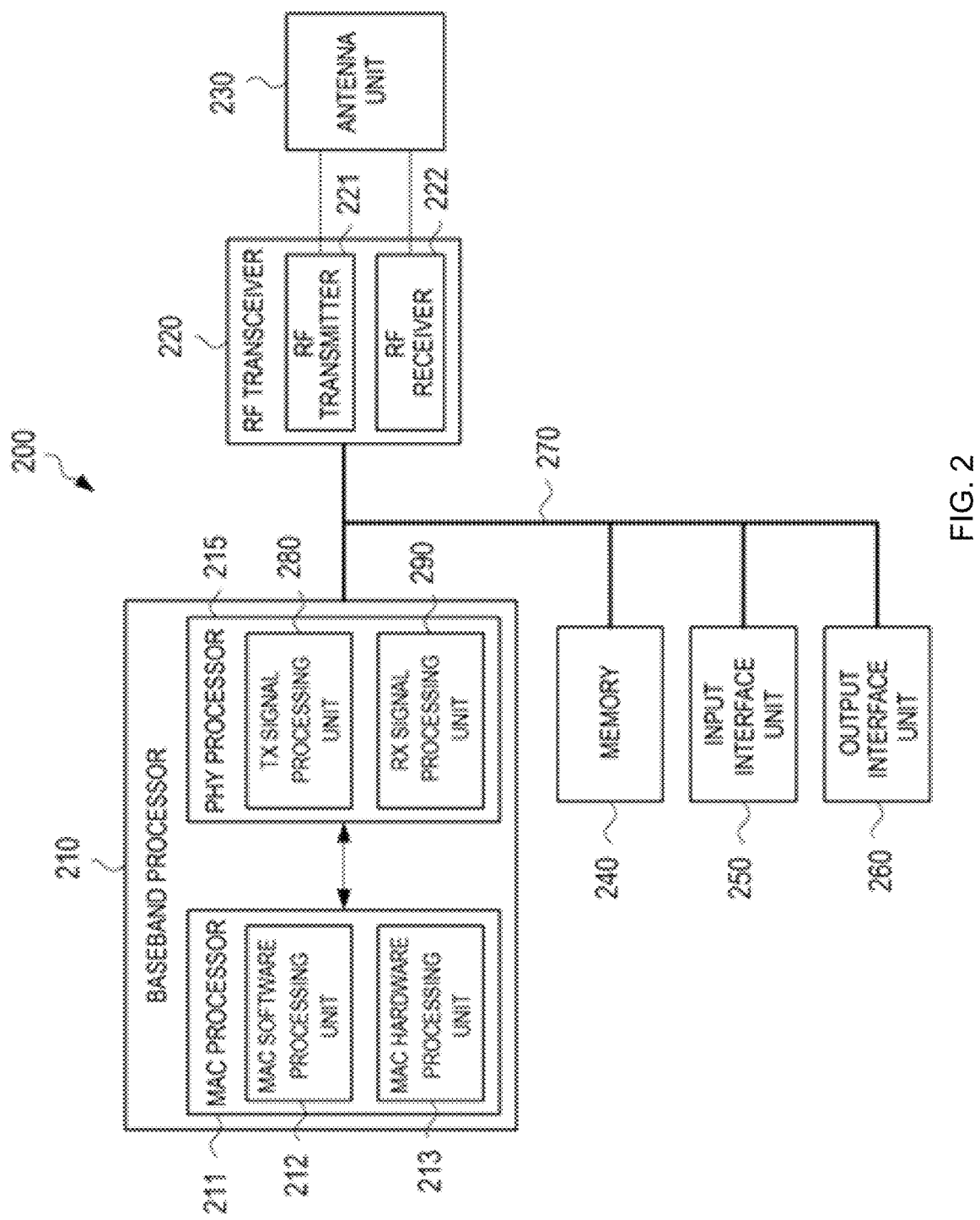
FIG. 2 illustrates a schematic diagram of an exemplary wireless communication device, according to some aspects of the disclosure.

FIG. 2 illustrates a schematic diagram of an exemplary wireless communication device, according to some aspects of the disclosure. The wireless communication device 200 can be a client device, client devices 112A-115A and 112B-115B, a network device, e.g., network devices 111A and 111B, or a network controller. The wireless communication device 200 includes a baseband processor 210, a radio frequency (RF) transceiver 220, an antenna unit 230, a memory 240, an input interface unit 250, an output interface unit 260, and a bus 270, or subsets and variations thereof. The wireless communication device 200 can be, or can be a part of, any of the network devices 111A or 111B.

In the example, the baseband processor 210 performs baseband signal processing, and includes a media access control (MAC) processor 211 and a PHY processor 215. The memory 240 may store software (such as MAC software) including at least some functions of a MAC layer. The memory may further store an operating system and applications.

In the illustration, the MAC processor 211 includes a MAC software processing unit 212 and a MAC hardware processing unit 213. The MAC software processing unit 212 executes the MAC software to implement some functions of the MAC layer, and the MAC hardware processing unit 213 may implement remaining functions of the MAC layer as hardware (MAC hardware). However, the MAC processor 211 may vary in functionality depending on implementation. The PHY processor 215 includes a transmitting (TX) signal processing unit 280 and a receiving (RX) signal processing unit 290. The term TX may refer to transmitting, transmit, transmitted, transmitter, or the like. The term RX may refer to receiving, receive, received, receiver, or the like.

The PHY processor 215 interfaces to the MAC processor 211 through, among others, transmit vector (TXVECTOR) and receive vector (RXVECTOR) parameters. In some aspects, the MAC processor 211 generates and provides TXVECTOR parameters to the PHY processor 215 to supply per-packet transmit parameters. In some aspects, the PHY processor 215 generates and provides RXVECTOR parameters to the MAC processor 211 to inform the MAC processor 211 of the received packet parameters.

In some aspects, the wireless communication device 200 includes a read-only memory (ROM) (not shown) or registers (not shown) that store instructions that are needed by one or more of the MAC processor 211, the PHY processor 215, and/or other components of the wireless communication device 200.

In some embodiments, the wireless communication device 200 includes a permanent storage device (not shown) configured as a read-and-write memory device. The permanent storage device may be a non-volatile memory unit that stores instructions even when the wireless communication device 200 is off. The ROM, registers, and the permanent storage device may be part of the baseband processor 210 or be a part of the memory 240. Each of the ROM, the permanent storage device, and the memory 240 may be an exemplary memory or a computer-readable medium. A memory may be one or more memories.

The memory 240 may be a read-and-write memory, a read-only memory, a volatile memory, a non-volatile memory, or a combination of some or all of the foregoing. The memory 240 may store instructions that one or more of the MAC processor 211, the PHY processor 215, and/or another component may need at runtime.

The radio frequency (RF) transceiver 220 includes an RF transmitter 221 and an RF receiver 222. The input interface unit 250 receives information from a client device, and the output interface unit 260 outputs information to the client device. The antenna unit 230 includes one or more antennas. When multi-input multi-output (MIMO) or multi-user MIMO (MU-MIMO) is used, the antenna unit 230 may include more than one antenna.

The bus 270 collectively represents all system, peripheral, and chipset buses that communicatively connect the numerous internal components of the wireless communication device 200. In some embodiments, the bus 270 communicatively connects the baseband processor 210 with the memory 240. From the memory 240, the baseband processor 210 may retrieve instructions to execute and data to process in order to execute the processes of the subject disclosure. The baseband processor 210 can be a single processor, multiple processors, or a multi-core processor in different embodiments. The baseband processor 210, the memory 240, the input interface unit 250, and the output interface unit 260 may communicate with each other via the bus 270.

The bus 270 also connects to the input interface unit 250 and the output interface unit 260. The input interface unit 250 enables a user to communicate information and select commands to the wireless communication device 200. Input devices that may be used with the input interface unit 250 may include any acoustic, speech, visual, touch, tactile, and/or sensory input device, e.g., a keyboard, a pointing device, a microphone, or a touchscreen. The output interface unit 260 may enable, for example, the display or output of videos, images, audio, and data generated by the wireless communication device 200. Output devices that may be used with the output interface unit 260 may include any visual, auditory, tactile, and/or sensory output device, e.g., printers and display devices or any other device for outputting information. Some embodiments may include devices that function as both input and output devices, such as a touchscreen.

Some embodiments can be realized in part or in whole using a computer-readable medium. In one aspect, a computer-readable medium includes one or more media. In some aspects, a computer-readable medium is a tangible computer-readable medium, a computer-readable storage medium, a non-transitory computer-readable medium, a machine-readable medium, a memory, or some combination of the foregoing (e.g., a tangible computer-readable storage medium, or a non-transitory machine-readable storage medium). In some aspects, a computer is a machine. In some aspects, a computer-implemented method is a machine-implemented method.

A computer-readable medium may include storage integrated into a processor and/or storage external to a processor. A computer-readable medium may be a volatile, non-volatile, solid state, optical, magnetic, and/or other suitable storage device, e.g., RAM, ROM, PROM, EPROM, a flash, registers, a hard disk, a removable memory, or a remote storage device.

In one aspect, a computer-readable medium comprises instructions stored therein. In one aspect, a computer-readable medium is encoded with instructions. In one aspect, instructions are executable by one or more processors (e.g., 210, 211, 212, 213, 215, 280, 290) to perform one or more operations or a method. Instructions may include, for example, programs, routines, subroutines, data, data structures, objects, sequences, commands, operations, modules, applications, and/or functions. Those skilled in the art would recognize how to implement the instructions.

A processor (e.g., 210, 211, 212, 213, 215, 280, 290) may be coupled to one or more memories (e.g., one or more external memories such as the memory 240, one or more memories internal to the processor, one or more registers internal or external to the processor, or one or more remote memories outside of wireless communication device 200), for example, via one or more wired and/or wireless connections. The coupling may be direct or indirect. In one aspect, a processor includes one or more processors. A processor, including a processing circuitry capable of executing instructions, may read, write, or access a computer-readable medium. A processor may be, for example, an application specific integrated circuit (ASIC), a digital signal processor (DSP), or a field programmable gate array (FPGA).

In one aspect, a processor (e.g., 210, 211, 212, 213, 215, 280, 290) is configured to cause one or more operations of the subject disclosure to occur. In one aspect, a processor is configured to cause an apparatus (e.g., a wireless communication device 200) to perform operations or a method of the subject disclosure. In some embodiments, a processor configuration involves having a processor coupled to one or more memories. A memory may be internal or external to the processor. Instructions may be in a form of software, hardware or a combination thereof. Software instructions (including data) may be stored in a memory. Hardware instructions may be part of the hardware circuitry components of a processor. When the instructions are executed or processed by one or more processors, (e.g., 210, 211, 212, 213, 215, 280, 290), the processors may cause one or more operations of the subject disclosure to occur or cause an apparatus (e.g., a wireless communication device 200) to perform operations or a method of the subject disclosure.

Figure 3:
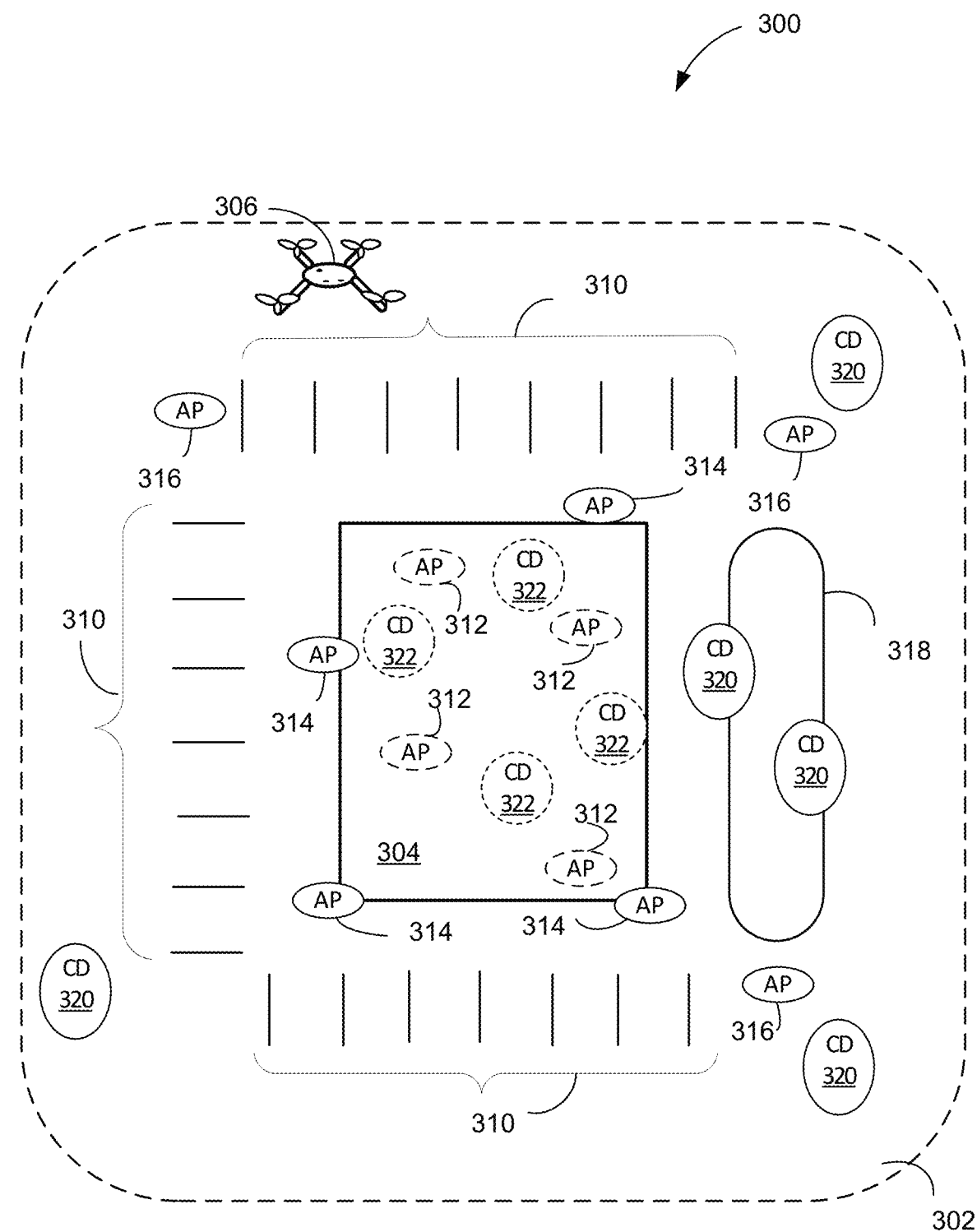
FIG. 3 illustrates a schematic diagram of an exemplary communication system, according to some aspects of the disclosure.

FIG. 3 illustrates a schematic diagram of an exemplary communication system, according to some aspects of the disclosure. As shown in FIG. 3, diagram 300 includes building 304 that is located in lot 302. Lot 302 includes a number of parking spaces 310 and a recreational area 318. As shown, four network devices 312 and four client devices 322 are located inside building 304. In addition, four network devices 314 are located on a roof of building 304 and three network devices 316 and five client devices 320 are located in an area outside building 304. In some examples, building 304 comprises of multiple buildings in lot 302. As shown in FIG. 3, unmanned aerial vehicle 306 may have entered lot 302 and may be approaching building 304. In some examples, at least one of the network devices 314 or 316 may have detected a signal and may have determined that the signal is from an unmanned aerial vehicle. In some embodiments, the network devices that have determined the signal is from an unmanned aerial vehicle may independently send interference signals to the unmanned aerial vehicle. In some embodiments, a network controller may be coupled to network devices 312, network devices 314, and network device 316. The network controller may control network devices 312, 314, and 316. The network controller may receive signals from at least three network devices, e.g., from three of network devices 314 and 316, that an unmanned aerial vehicle signal is determined to be located with a radio frequency coverage area of the network. For example, the network controller may determine the location of the unmanned aerial vehicle using triangulation based on the received signals from the at least three network device. The network controller may determine, based on the received signal strength indicator of the network devices, the network device closest to the unmanned aerial vehicle. The network controller may instruct the network device closest to the unmanned aerial vehicle to transmit the interference signals to the unmanned aerial vehicle to force unmanned aerial vehicle 306 out of lot 302.

In some examples, two or more network devices, with known locations for the network devices, receive the unmanned aerial vehicle signal. Based on a triangulation method, the network controller may determine an estimate of a location of the unmanned aerial vehicle signal. The network controller may then instruct one of the network devices, e.g., the network device closest to the unmanned aerial vehicle, to transmit the interference signal with a duty cycle of around 50 percent. In some examples, the network controller may instruct two of the network devices, e.g., the network devices closer to the unmanned aerial vehicle, to transmit the interference signals with a duty cycle of around 25 percent.

In some embodiments, the network controller is consistent with wireless communication device 200 of FIG. 2. In some embodiments, network devices 312, network devices 314, and network devices 316 are consistent with wireless communication device 200 of FIG. 2. In some embodiments, client devices 320 and client devices 322 are consistent with wireless communication device 200 of FIG. 2.

Figure 4:
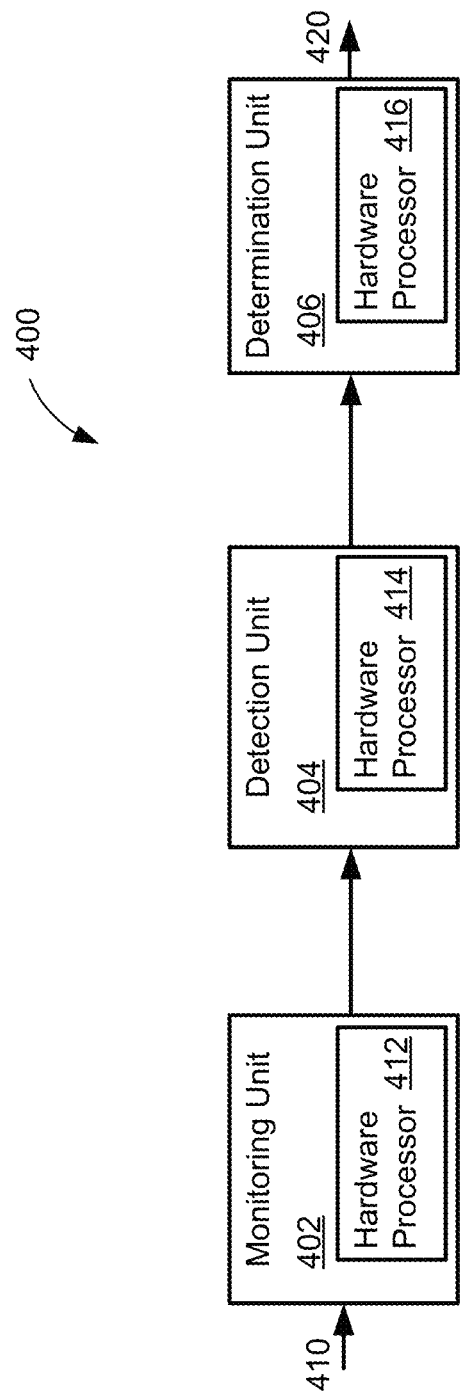
FIG. 4 illustrates a schematic diagram of an exemplary processing system, according to some aspects of the disclosure.

FIG. 4 illustrates a schematic diagram of an exemplary processing system, according to some aspects of the disclosure. Processing system 400 of FIG. 4 may be included in a network device such as network device 111A or 111B of FIG. 1 and may comprise monitoring unit 402, detection unit 404, and determination unit 406. In some embodiments, processing system 400 is included in a controller of network device 111A or 111B. In some embodiments, monitoring unit 402 includes hardware processor 412 to perform operations performed by monitoring unit 402. Monitoring unit 402 may separately monitor communication links between network device 111A and each one of client devices 112A-115A. Based on monitoring each communication link, monitoring unit 402 may receive signals that are not originated from client devices 112A-115A. In some embodiments, a communication link of a wireless local area network between a client device such as each one of client devices 112B-115B and a network device such as network device 111B band may include at least a primary channel. In some embodiments, the communication link may additionally include a secondary channel. In some examples, monitoring unit 402 may receive signals that are not originated from client devices 112A-115A through the primary channel and/or the secondary channel of the communication link. In some embodiments, monitoring unit 402 may be coupled to a receiver of the network device. Monitoring unit 402 may receive signals 410 via the receiver of the network device. The receiver of the network device may be consistent with radio frequency (RF) receiver 222 of FIG. 2.

As described, mobile communication, wireless local area network communication from another communication system, and unmanned aerial vehicle signals may interfere with wireless local area network communication. In some examples, wireless local area network communication from another communication system may be recognizable by network devices 111A and 111B and the network device may realize that the communication was not intended for network devices 111A or 111B. In some examples, mobile communication and unmanned aerial vehicle signals may not be recognizable by the network devices, however, the network device may be able to detect a portion of the unmanned aerial vehicle signals. In some embodiments, detection unit 404 of processing system 400 includes hardware processor 414 to perform operations performed by detection unit 404. Detection unit 404 may detect a portion of the received signal and determine that the signal is originated from an unmanned aerial vehicle. In some embodiments, by detecting a portion of the received signal, detection unit 404 may determine a MAC address in the portion of the received signal. In some examples, a MAC address of a device includes an Organizational Unique Identifier (OUI), which indicates a vendor, e.g., manufacturer, of the device.

In some embodiments, detection unit 404 may comprise a processor and a memory. The processor of the detection unit may retrieve a table of MAC addresses associated with different manufacturers from the memory. In some examples, the processor extracts the OUIs associated with MAC addresses of different unmanned aerial vehicle manufacturers. Based on the table of MAC addresses and/or based on the extracted OUIs, the processor may determine, e.g., identify, that the detected MAC address belongs to an unmanned aerial vehicle manufacturer. Thus, the processor may determine that the signal is originated from an unmanned aerial vehicle such as unmanned aerial vehicle 306 of FIG. 3.

In some embodiments, detection unit 404 of processing system 400 may determine an extended service set identification (ESSID) in the received signal. The ESSID may be associated with a transmitter of the signal. Thus, based on the ESSID, the signal may be identified as being transmitted by an unmanned aerial vehicle.

In some embodiments, determination unit 406, based on a received signal strength indicator (RSSI) of the signal 410 of the unmanned aerial vehicle may decide to transmit a signal to the unmanned aerial vehicle. In some examples, the received signal strength indicator is a measure of power present in a received radio signal. In some embodiments, determination unit 406 is coupled to a transmitter of the network device. In some embodiments, determination unit 406 includes hardware processor 416 to perform operations performed by determination unit 406. Determination unit 406 may send commands 420 to the transmitter of the network device. Commands 420 may include a type and parameters of the signal to be transmitted to the unmanned aerial vehicle. In some examples, the received signal strength indicator of the signal of the unmanned aerial vehicle is high, e.g., it is stronger than wireless local area network signals. Then commands 420 may instruct the transmitter of the network device to send an interference signal with a duty cycle of around fifty percent. In some embodiments, the transmitter of the network device may transmit the interference signal in the same channel of the communication link that the unmanned aerial vehicle signal was received. In some embodiments, the interference signal with a duty cycle of fifty percent may prevent the unmanned aerial vehicle from receiving commands, e.g., control commands, and may be forced to leave. In some examples, when the received signal strength indicator of the signal of the unmanned aerial vehicle is moderate, e.g., around half of wireless local area network signals, then commands 420 may instruct the transmitter of the network device to send an interference signal with a duty cycle of around 25 percent. In some examples, when the received signal strength indicator of the signal of the unmanned aerial vehicle is low, e.g., around five percent of wireless local area network signals, then commands 420 may instruct the transmitter of the network device to stop transmitting the interference signal. In some embodiments, the received signal strength indicator of the signal of the unmanned aerial vehicle does not indicate that a signal is transmitted from the unmanned aerial vehicle. Then commands 420 may instruct the transmitter of the network device to stop transmitting the interference signal.

Alternatively, in some examples, when the received signal strength indicator of the signal of the unmanned aerial vehicle is high, then commands 420 may instruct the transmitter of the network device to transmit de-authentication frames with a duty cycle of around fifty percent. In some examples, when the received signal strength indicator of the signal of the unmanned aerial vehicle is high then commands 420 may instruct the transmitter of the network device to transmit disassociation frames with a duty cycle of around fifty percent. In some embodiments, after sending commands 420, monitoring unit 402 continues monitoring a received signal strength indicator of the signal of the unmanned aerial vehicle signal. When a received signal strength indicator of the signal of the unmanned aerial vehicle signal is reduced, which may be an indication that the unmanned aerial vehicle is leaving, the duty cycle may be reduced. When a received signal strength indicator of the signal of the unmanned aerial vehicle signal is increased, which may be an indication that the unmanned aerial vehicle is getting closer to a network device, the duty cycle may be increased.

In some embodiments, monitoring unit 402 of processing system 400 of FIG. 4 is includes in network device 111B of FIG. 1. Monitoring unit 402 may monitor a communication channel between network device 111B and one of client devices 112B-115B in wireless communication subnetwork 150B. Detection unit 404 of processing system 400, may detect a signal such as signal 410 that is received by monitoring unit 402 via a receiver of network device 111B. Detection unit 404 may identify the signal as being transmitted by an unmanned aerial vehicle such as unmanned aerial vehicle 306 of FIG. 3. Signal 410 may be detected on a communication channel of a communication link between network device 111B and one of client devices 112B-115B. In some embodiments, determination unit 406 that is coupled to a transmitter of network device 111B may send commands 420 to the transmitter of network device 111B. In response, the transmitter of network device 111B may transmit an interference signal with a duty cycle of a predetermined value, e.g., 50 percent, in the communication channel. Monitoring unit 402 of processing system 400 may continuously monitor the communication channel and may determine a received signal strength indicator of the signal identified from the unmanned aerial vehicle.

In some examples, at least two network devices may receive the unmanned aerial vehicle signal. The network controller, based on the received signal strength indicator at the at least two network devices, may instruct a group one or more network devices to send the interference signal to the unmanned aerial vehicle 306 of FIG. 3.

In some embodiments, in response to commands 420, the transmitter of network device 111B may transmit de-authentication frames with a duty cycle of 50 percent in the communication channel. In some embodiments, in response to commands 420, the transmitter of network device 111B may transmit disassociation frames with a duty cycle of 50 percent in the communication channel. In some embodiments, the communication channel of the network device 111B is associated with a client device such as one of client devices 112B-115B. Thus, before transmitting an interference signal, a de-authentication frame, or a disassociation frame, on the communication channel, the network device 111B may redirect the client device to another communication channel of network device 111B.

In some embodiments, the processing system 400 of network device 111B may detect two or more signals as being transmitted by an unmanned aerial vehicle on two or more communication channels of network device 111B. In some embodiments, at least one of the two or more communication channels of the network device 111B is associated with a client device such as one of client devices 112B-115B. Thus, before transmitting an interference signal, a de-authentication frame, or a disassociation frame, on the two or more communication channels, a network controller may redirect the client device to another network device such as network device 111A of FIG. 1.

Figure 5A:
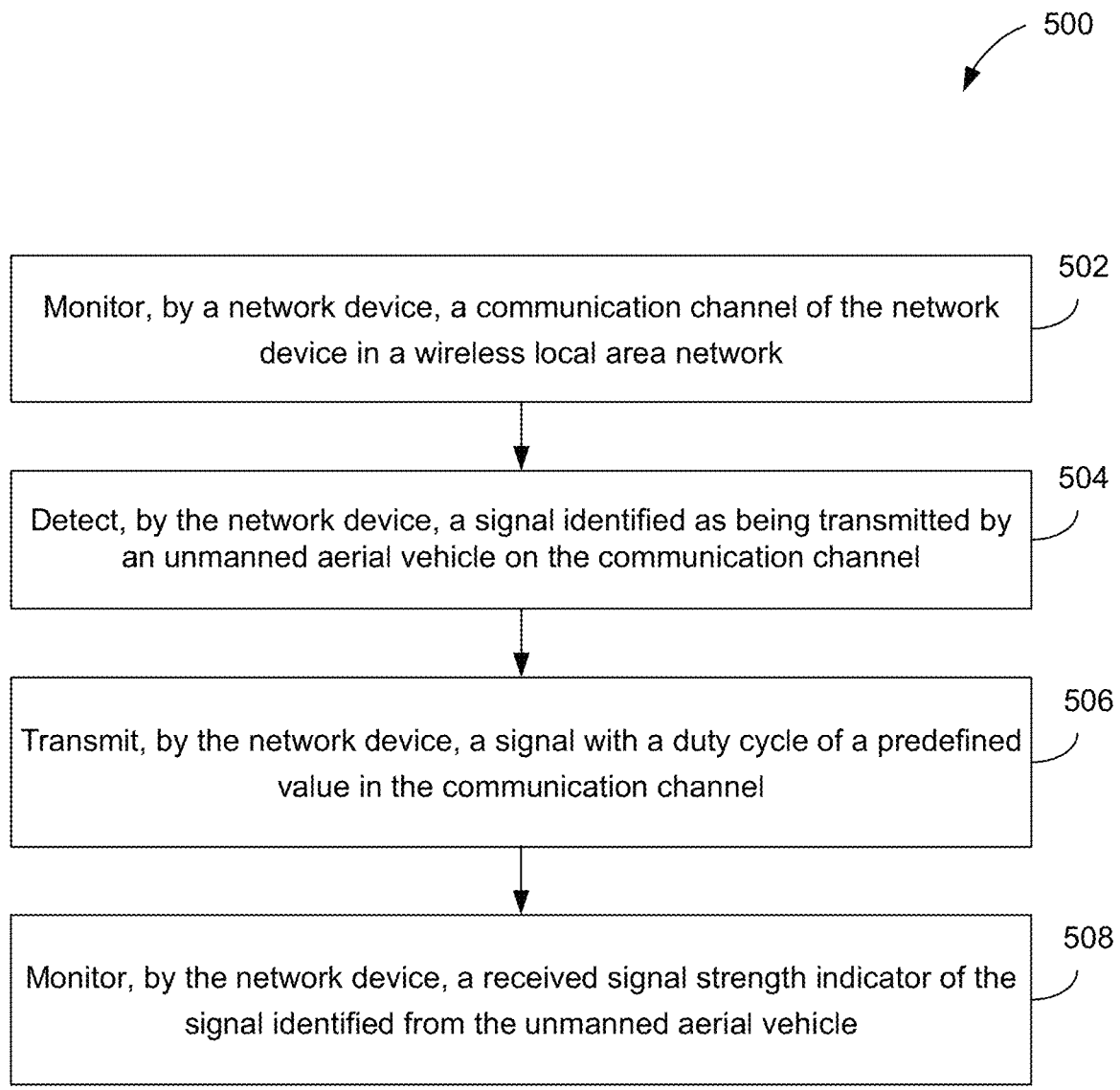
FIGS. 5A-5C illustrate flow diagrams of exemplary processes for monitoring a communication link of a client device, according to some aspects of the disclosure.
Figure 5B:
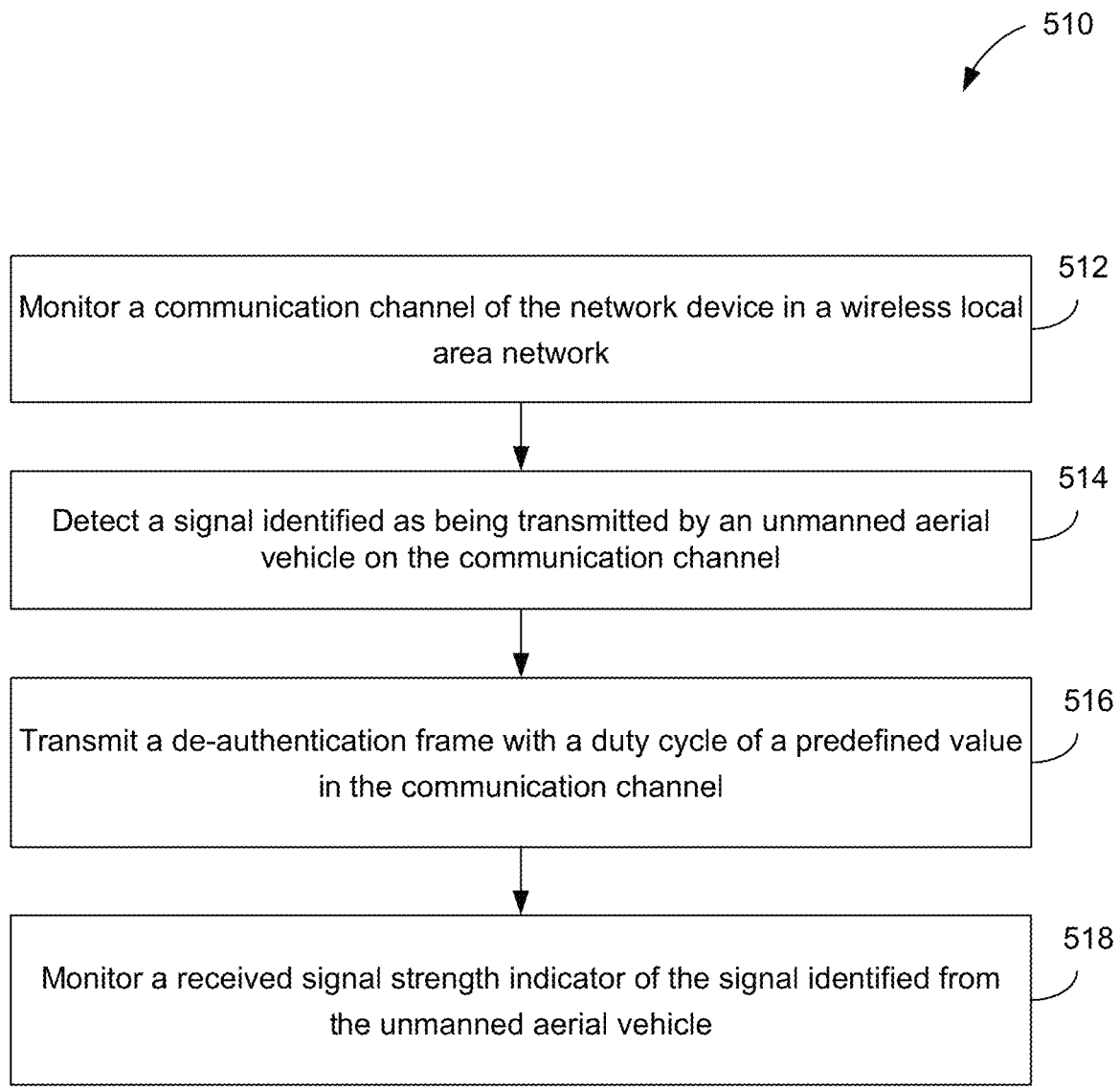
Figure 5C:
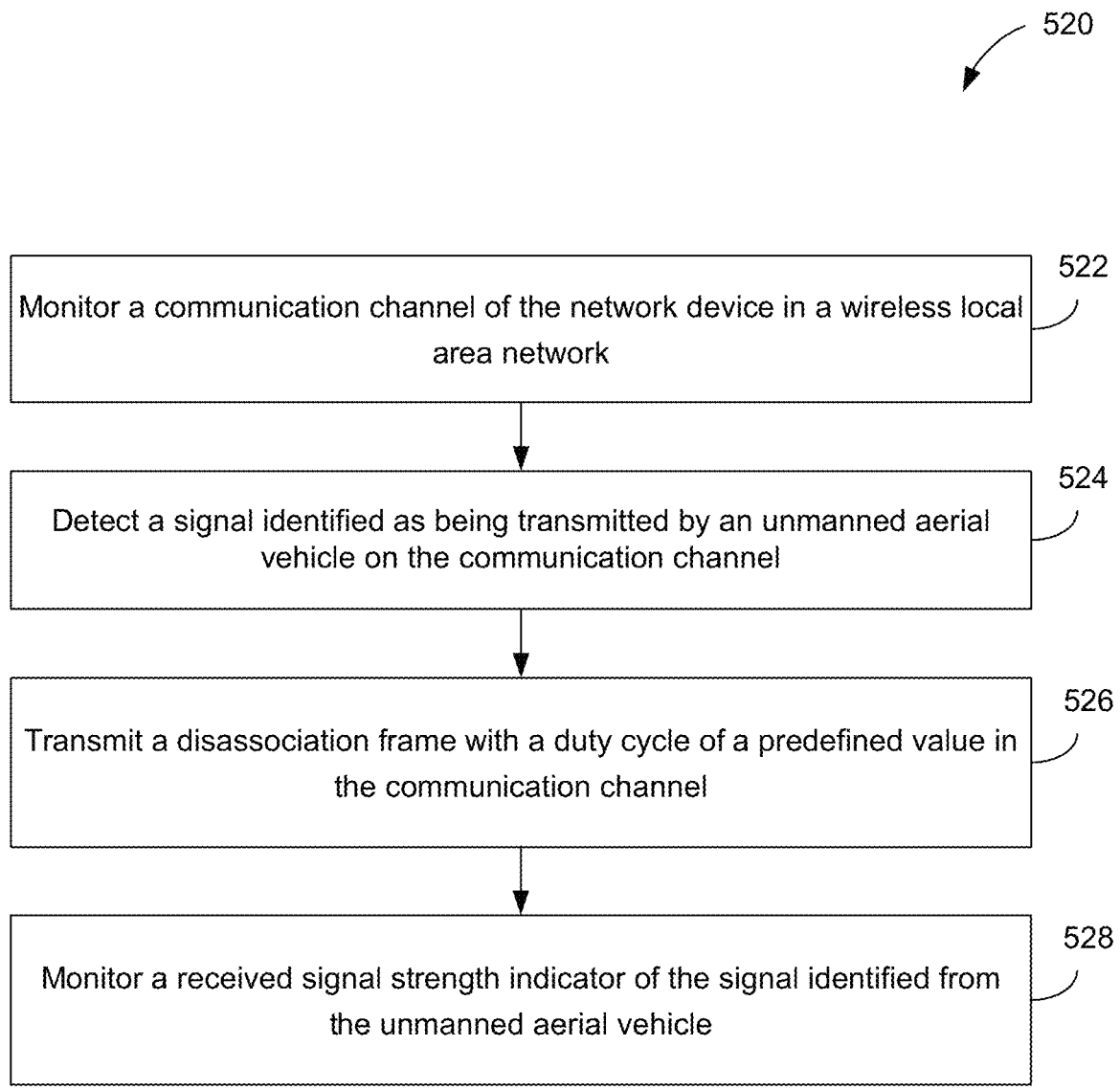

FIGS. 5A-5C illustrate flow diagrams of exemplary processes for monitoring a communication link of a client device, according to some aspects of the disclosure. Notably, one or more steps of processes 500 of FIG. 5A, 510 of FIG. 5B, and 520 of FIG. 5C described herein may be omitted, performed in a different sequence, and/or combined with other processes for various types of applications contemplated herein. Processes 500, 510, and 520 can be performed by network devices of FIGS. 1 and 2. In some examples, communication links between client devices 112A-115A and network device 111A, or between client devices 112B-115B and network device 111B, of FIG. 1 are monitored.

The process 500 begins at step 502, where a communication channel in wireless local network is monitored by a network device. As described, each communication link of the communication system of FIG. 1 may include a primary channel. In some examples, the communication may also include a secondary channel. The monitoring unit 402 of processing system 400 of FIG. 4 may be included in a network device. The processing system may be coupled to a receiver of the network device and thus monitoring unit 402 may be able to monitor a primary channel and/or a secondary channel of each communication link of the network device. In some examples, each communication link between each network device and the client devices coupled to the network devices are monitored. Processes 510 and 520 begin at steps 512 and 522 that are similar to step 502.

In step 504, a signal identified as being transmitted by an unmanned aerial vehicle is detected by the network device. As described, some of the signals received by a receiver of the network device such as RF receiver 222 of FIG. 2 may be from client devices of wireless local area networks and thus may be detectable. Other signals received by the receiver of the network device may not be detectable; however, detection unit 404 of processing system 400 may detect a MAC number associated with a transmitter of the signal. As described, based on the MAC number, detection unit 404 may determine that the signal was originated from a transmitter of an unmanned aerial vehicle. In some examples, a predefined portion of a MAC number may be used to include a manufacture's code, e.g., an Organizational Unique Identifier. Thus, detection unit 404 may determine based on the predefined portion of the MAC number that the transmitted MAC number belongs to an unmanned aerial vehicle vendor or manufacturer and thus the signal is from an unmanned aerial vehicle. Processes 510 and 520 perform steps 514 and 524 that are similar to step 504.

In step 506, a signal is transmitted in the communication channel by the network device and the signal has a duty cycle of a predefined value. In response to determining that the signal is originated from an unmanned aerial vehicle, command 420 is generated by determination unit 406 of processing system 400 of FIG. 4. Processing system 400 may be coupled to a transmitter of a network device that is consistent with RF transmitter 221 of FIG. 2. Thus, processing system 400 may send command 420 to the transmitter of the network device. In response, the transmitter of the network device may transmit the signal to the unmanned aerial vehicle in the same channel that the unmanned aerial vehicle signal was received. In some examples, the signal is an interference signal may have a duty cycle of fifty percent and thus the channel may not be used in communication links with client devices of the network device. Therefore, prior to transmitting the interference signal, the network device may transfer the client devices to another channel of the network device. Process 510 in step 514 may transmit a de-authentication frame with a duty cycle of the predefined value in the communication channel. Process 520 in step 524 may transmit a disassociation frame with a duty cycle of the predefined value in the communication channel.

In step 508, a received signal strength indicator of the signal identified from the unmanned aerial vehicle is monitored. The monitoring is performed to determine if the unmanned aerial vehicle is approaching the network devices or moving away from the network devices. In some examples, the duty cycle of the signal is increased when the unmanned aerial vehicle is approaching and is reduced when the unmanned aerial vehicle is approaching is moving away. Processes 510 and 520 perform steps 518 and 528 that are similar to step 508.

In some examples, the network device may inform the network controller that signals from unmanned aerial vehicle may be present in several of the communication channels. Thus, the network controller of the communication system may hand over the client devices to another, e.g., a neighboring, network device of the communication system.

In some examples, the network device may determine that a signal of the unmanned aerial vehicle is present in the secondary channel but not in the primary channel of a communication link with a client device. The network device may release the secondary channel of the communication like and may user the secondary channel to send the interference signal, the de-authentication frames, or the disassociation frames.

The present disclosure is provided to enable any person skilled in the art to practice the various aspects described herein. The disclosure provides various examples of the subject technology, and the subject technology is not limited to these examples. Various modifications to these aspects will be readily apparent to those skilled in the art, and the generic principles defined herein may be applied to other aspects.

A reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the invention.

The word "exemplary" is used herein to mean "serving as an example or illustration." Any aspect or design described herein as "exemplary" is not necessarily to be construed as preferred or advantageous over other aspects or designs. In one aspect, various alternative configurations and operations described herein may be considered to be at least equivalent.

As used herein, the phrase "at least one of" preceding a series of items, with the term "or" to separate any of the items, modifies the list as a whole, rather than each item of the list. The phrase "at least one of" does not require selection of at least one item; rather, the phrase allows a meaning that includes at least one of any one of the items, and/or at least one of any combination of the items, and/or at least one of each of the items. By way of example, the phrase "at least one of A, B, or C" may refer to: only A, only B, or only C; or any combination of A, B, and C.

A phrase such as an "aspect" does not imply that such aspect is essential to the subject technology or that such aspect applies to all configurations of the subject technology. A disclosure relating to an aspect may apply to all configurations, or one or more configurations. An aspect may provide one or more examples. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples. A phrase such as an embodiment may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples. A phrase such as a configuration may refer to one or more configurations and vice versa.

In one aspect, unless otherwise stated, all measurements, values, ratings, positions, magnitudes, sizes, and other specifications that are set forth in this specification, including in the claims that follow, are approximate, not exact. In one aspect, they are intended to have a reasonable range that is consistent with the functions to which they relate and with what is customary in the art to which they pertain.

It is understood that the specific order or hierarchy of steps, operations, or processes disclosed is an illustration of exemplary approaches. Based upon design preferences, it is understood that the specific order or hierarchy of steps, operations, or processes may be rearranged. Some of the steps, operations, or processes may be performed simultaneously. Some or all of the steps, operations, or processes may be performed automatically, without the intervention of a user. The accompanying method claims, if any, present elements of the various steps, operations, or processes in a sample order, and are not meant to be limited to the specific order or hierarchy presented.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112 (f) unless the element is expressly recited using the phrase "module for" or, in the case of a method claim, the element is recited using the phrase "step for." Furthermore, to the extent that the term "include," "have," or the like is used, such term is intended to be inclusive in a manner similar to the term "comprise" as "comprise" is interpreted when employed as a transitional word in a claim.

What is claimed is:

1. A method, comprising:
   monitoring, by a network device, a communication channel of the network device in a wireless local area network;
   detecting, by the network device, a signal identified as being transmitted by an unmanned aerial vehicle on the communication channel;
   transmitting, by the network device, a second signal with a duty cycle of a predetermined value in the communication channel;
   monitoring, by the network device, a received signal strength indicator of the signal identified from the unmanned aerial vehicle;
   determining a received signal strength indicator of the signal at a first instance of time and at a second instance of time after the first instance of time;
   increasing the duty cycle of the second signal at the second instance of time if the received signal strength indicator of the signal increases between the first instance of time and the second instance of time; and
   decreasing the duty cycle of the second signal at the second instance of time if the received signal strength indicator of the signal decreases between the first instance of time and the second instance of time.

2. The method of claim 1, wherein in response to at least a client device associated with the communication channel of the network device, redirecting the client device to another communication channel.

3. The method of claim 1, wherein detecting the signal identified as being transmitted by an unmanned aerial vehicle further includes:
   extracting, by the network device, a media access control (MAC) number from the detected signal, the MAC number identifying a manufacturer of a transmitter of the detected signal; and
   identifying, based on the MAC number, that the detected signal is transmitted by the unmanned aerial vehicle.

4. The method of claim 1, wherein the predetermined value of the duty cycle is 50 percent and the second signal is an interference signal.

5. The method of claim 1, further comprising:
   stop transmitting the second signal when the signal identified as being transmitted by the unmanned aerial vehicle is not detected.

6. The method of claim 1, wherein in response to detecting at least a client device associated with the communication channel of the network device, redirecting the client device to a communication channel of another network device.

7. The method of claim 1, further comprising:
monitoring an additional communication channel by the network device;
detecting another signal identified as being transmitted by the unmanned aerial vehicle on the additional communication channel; and
transmitting the second signal with the duty cycle of the predetermined value in the additional communication channel.

8. The method of claim 1, wherein the communication channel is either at a 5 GHz band or at a 2.4 GHz band.

9. The method of claim 1, wherein detecting the signal identified as being transmitted by an unmanned aerial vehicle further includes:
determining an extended service set identification (ESSID) from the detected signal; and
identifying, based on the ESSID, that the signal is transmitted by the unmanned aerial vehicle.

10. A network device, comprising:
a memory; and
a processor executing instructions from the memory to:
monitor a communication channel of the network device in a wireless local area network;
detect a signal identified as being transmitted by an unmanned aerial vehicle on the communication channel;
transmit a de-authentication frame with a duty cycle of a predetermined value in the communication channel;
monitor a received signal strength indicator of the signal identified from the unmanned aerial vehicle;
determine a received signal strength indicator of the signal at a first instance of time and at a second instance of time after the first instance of time;
increase the duty cycle of the de-authentication frame at the second instance of time if the received signal strength indicator of the signal increases between the first instance of time and the second instance of time; and
decrease the duty cycle of the de-authentication frame at the second instance of time if the received signal strength indicator of the signal decreases between the first instance of time and the second instance of time.

11. The network device of claim 10, wherein in response to at least a client device associated with the communication channel, redirect the client device to another communication channel.

12. The network device of claim 10, wherein to detect the signal identified as being transmitted by an unmanned aerial vehicle, the processor further executes instructions to:
extract a media access control (MAC) number from the detected signal, the MAC number identifying a manufacturer of a transmitter of the detected signal; and
identify, based on the MAC number, that the detected signal is transmitted by the unmanned aerial vehicle.

13. The network device of claim 10, wherein the processor further executes instructions to:
stop transmitting the de-authentication frame when the signal identified as being transmitted by the unmanned aerial vehicle is not detected.

14. A non-transitory machine-readable storage medium encoded with instructions executable by at least one processor of a network device, the machine-readable storage medium comprising instructions to:
monitor a communication channel of the network device in a wireless local area network;
detect a signal identified as being transmitted by an unmanned aerial vehicle on the communication channel;
transmit a disassociation frame with a duty cycle of a predetermined value in the communication channel; and
monitor a received signal strength indicator of the signal identified from the unmanned aerial vehicle;
determine a received signal strength indicator of the signal at a first instance of time and at a second instance of time after the first instance of time;
increase the duty cycle of the disassociation frame at the second instance of time if the received signal strength indicator of the signal increases between the first instance of time and the second instance of time; and
decrease the duty cycle of the disassociation frame at the second instance of time if the received signal strength indicator of the signal decreases between the first instance of time and the second instance of time.

15. The non-transitory machine-readable storage medium of claim 14, wherein in response to at least a client device associated with the communication channel of, redirect the client device to another communication channel.

16. The non-transitory machine-readable storage medium of claim 14, wherein to detect the signal identified as being transmitted by an unmanned aerial vehicle, the processor further executes instructions to:
extract a media access control (MAC) number from the detected signal, the MAC number identifying a manufacturer of a transmitter of the detected signal; and
identify, based on the MAC number, that the detected signal is transmitted by the unmanned aerial vehicle.

17. The non-transitory machine-readable storage medium of claim 14, wherein the processor further executes instructions to:
stop transmitting the disassociation frame when the signal identified as being transmitted by the unmanned aerial vehicle is not detected.

* * * * *